(12) United States Patent
Anand et al.

(10) Patent No.: US 11,567,893 B2
(45) Date of Patent: Jan. 31, 2023

(54) METHOD AND A MIRRORED SERIAL INTERFACE (MSI) FOR TRANSFERRING DATA

(71) Applicant: Centre For Development Of Telematics (C-DOT), New Delhi (IN)

(72) Inventors: Kashish Anand, New Delhi (IN); Ashok Gupta, New Delhi (IN); Atul Kumar Gupta, New Delhi (IN); Praveen Kumar Mathur, New Delhi (IN); Vipin Tyagi, New Delhi (IN)

(73) Assignee: CENTRE FOR DEVELOPMENT OF TELEMATICS (C-DOT), New Delhi (IN)

( * ) Notice: Subject to any disclaimer, the term of this patent is extended or adjusted under 35 U.S.C. 154(b) by 824 days.

(21) Appl. No.: 16/471,259

(22) PCT Filed: May 15, 2017

(86) PCT No.: PCT/IN2017/050179
§ 371 (c)(1),
(2) Date: Jun. 19, 2019

(87) PCT Pub. No.: WO2018/116314
PCT Pub. Date: Jun. 28, 2018

(65) Prior Publication Data
US 2021/0357352 A1 Nov. 18, 2021

(30) Foreign Application Priority Data
Dec. 21, 2016 (IN) .............................. 201611043737

(51) Int. Cl.
G06F 13/42 (2006.01)
G06F 9/30 (2018.01)
G06F 9/445 (2018.01)

(52) U.S. Cl.
CPC ...... G06F 13/4291 (2013.01); G06F 9/30134 (2013.01); G06F 9/44505 (2013.01)

(58) Field of Classification Search
CPC ............. G06F 9/30134; G06F 9/44505; G06F 13/4291
See application file for complete search history.

(56) References Cited

U.S. PATENT DOCUMENTS

| 5,260,933 A | 11/1993 | Rouse |
| 5,828,592 A | 10/1998 | Tran et al. |
| 6,198,736 B1 * | 3/2001 | Nyberg ................ H04B 7/2693 370/510 |
| 6,529,979 B1 | 3/2003 | Floyd et al. |

(Continued)

OTHER PUBLICATIONS

Search Report pertaining to application No. PCT/IN17/50179 dated Oct. 30, 2017.

*Primary Examiner* — Henry Tsai
*Assistant Examiner* — John B Roche
(74) *Attorney, Agent, or Firm* — Dinsmore & Shohl, LLP

(57) ABSTRACT

The present disclosure relates to a mirrored serial interface (MSI) for accessing peripherals through four wire serial interface. More particularly, the present disclosure is related to serial peripheral protocol with looped back mechanism in which contents of source data line are looped back onto the destination line and compared at every clock edge to ensure data sanity and to assert presence of slave and master device during and between cycles.

20 Claims, 8 Drawing Sheets

(56) References Cited

U.S. PATENT DOCUMENTS

| | | |
|---|---|---|
| 9,390,056 B1 * | 7/2016 | Noureddine ............ H04L 45/16 |
| 2002/0133662 A1 | 9/2002 | Cheung |
| 2004/0101133 A1 | 5/2004 | Le et al. |
| 2005/0163277 A1 | 7/2005 | Georgakos et al. |
| 2006/0143348 A1 | 6/2006 | Wilson et al. |
| 2008/0183928 A1 | 7/2008 | Devila et al. |
| 2012/0072628 A1 | 3/2012 | Crockett et al. |

* cited by examiner

METHOD AND A MIRRORED SERIAL INTERFACE (MSI) FOR TRANSFERRING DATA

FIELD OF THE INVENTION

The present disclosure relates to a method and a mirrored serial interface (MSI) for transferring data with loopback mechanism through four wire serial interface. More particularly, the present disclosure is related to mirrored serial interface (MSI) with loopback mechanism in which contents of source data line is looped back onto the destination line and compared at every clock edge to ensure data sanity and to assert presence of slave and master device during and between cycles.

BACKGROUND OF THE INVENTION

The serial peripheral interface (SPI) protocol is related to the serial communication between a master device and a slave device. Slave device may in turn cater to its own independent peripherals.

SPI bus is a synchronous serial data link standard that operates in full duplex mode with a single master device and one or more slave devices. Its implementation uses four signal lines for data and control i.e. SCLK, MOSI, MISO and SS, wherein SCLK refers to serial clock (output from master); MOSI or SIMO refers to master output-slave input (output from master); MISO or SOMI refers to master input-slave output (output from slave) and SS refers to slave select (active low, output from master). The shift register of master and slave are connected in a ring formation as shown in FIG. 1.

In a conventional SPI protocol, data frame or data transfer cycle is initiated by the master by asserting the SS line low and enabling the clock for the selected slave. The shift register of master and slave are connected in a ring formation. Hence, the master is writing the data and reading from it at the same time. This process continues until all the data bits are transferred to and from master and slave. It is for the controllers of the master and slave to decide if the data is meaningful or not.

However, the conventional SPI protocol suffers from the following disadvantages:
  SPI does not have an acknowledgement mechanism to confirm receipt of data. Data sanity is not ensured. Slave may receive inverted bits due to timing violations, channel noise or temperature changes.
  SPI master has no knowledge of whether a slave even exists, until complete transaction is executed. Master may continue to send data without even knowing if it is being received correctly.
  SPI also offers no flow control (no handshaking signals or acknowledgement) like REQ and ACK to tell whether slave has completed transacting with any slow peripheral it is serving. There is no mechanism to tell when slave is ready to transmit data during read cycle, in case of slower access at the secondary end of slave.
  US 2006/0143348 relates to a system, method, and apparatus for interchip communication between an extended serial peripheral interface (EPSI) master chip having clocking capability and an EPSI slave chip. The method comprises the master chip selecting a slave chip, the master clocking data into the slave chip from the master chip and at the same time clocking data from the slave chip into the master chip, and processing the clocked in data to negotiate further data transfer between the master chip and the slave chip. Selection of a slave chip by the master chip may also take place in response to an interrupt received by the master chip from the slave chip, with the master then clocking data in both directions to negotiate further data transfer between the master chip and the slave chip. However, this prior art document does not provide any provision for error detection and physical layer and it uses two general purpose lines for flow control.

US20020133662 related to the serial peripheral interface and high performance buffering scheme. An improved high performance buffering scheme is provided with a serial peripheral interface (SPI) to enable microcontroller-based products and other components and devices to achieve a higher serial transmit and receive data rate. The SPI comprises a single buffer having a high data rate, for example, at least the throughput of double buffer schemes, but without the increased size in logic area. To facilitate the throughput of data, the SPI single buffer can be configured with a queuing arrangement. The queuing arrangement for the SPI single buffer can comprise any queuing configuration, such as, for example, a circular queuing arrangement or a linear queuing arrangement. Through operation of the queuing arrangement, the SPI can be configured to provide for the receiving of new data in a register at substantially the same time that stored data can be transmitted to another device, thus the SPI can realize a high data rate. The queuing arrangement is configured in a FIFO buffer having a pointer and counter arrangement. In addition the buffering scheme can provide a high data rate without requiring frequent CPU polling or high interrupt overhead wherein the buffering scheme is configured with an interrupt configuration for identifying when data is ready for transmitting or for reading by the CPU. However, this prior art document does not provide any provision for error detection and aims to increase data rate over the serial link.

U.S. Pat. No. 6,529,979 relates to method and apparatus for a high-speed serial communications bus protocol with positive acknowledgement. There is two-wire serial bus consisting of an address line and a data line that connects a plurality of satellites in a daisy-chain fashion to a central source where address packet is modified by clearing the stop bit of the address packet to provide a positive acknowledgment of a receipt of the address packet back to the central source of the transaction. However, this prior art document does not ensure data sanity and does not provide provision for data flow control and physical layer.

U.S. Pat. No. 5,260,933 provides acknowledgement protocol for serial data network with out-of-order delivery. The data frames transmitted by the initiator node to the recipient node include frame serial number or sequence count information; Acknowledgment frames, transmitted by the recipient node to indicate delivery of the data frame or packet, include matching serial number or sequence count information; acknowledgement is received for each data frame transmission. However, this prior art document does not ensure data sanity and does not provide provision for error detection and it uses two general purpose lines for flow control.

OBJECT OF THE INVENTION

An object of the present disclosure is to ensure data sanity implementing a loop back mechanism i.e. data latched by the slave flip flop at the MISO line is looped back to the master at every clock edge for detecting instantaneous communication errors.

Another object of the present disclosure is to ascertain the presence/absence of slave and master by a looped back mechanism on the MISO and MOSI lines even in the absence of any accessing cycles.

Another object of the present disclosure is to provide flow control support to cater slow peripherals.

Yet another object of the present disclosure is to confirm the receipt of data by the destination to the source using acknowledgement mechanism.

SUMMARY OF THE INVENTION

An aspect of the present disclosure is to provide a method of transmitting data via a mirrored serial interface, the method comprising:

a master device receiving address, data and read/write command from a master host, loading address and read/write first in master shift register, shifting it to a slave device via MOSI line, simultaneously receiving mirrored address bits via MISO line to check for data sanity;

the slave device after successful transmission of address information fetching data from a slave host;

if the read instruction received, the slave device sending data to the master device via MISO line, simultaneously receiving mirrored data bits via MOSI line to check for data sanity;

if the write instruction received, the slave receiving the data from the master device and sharing it with the slave host for further processing, the master device again checking the mirrored data bits via the MISO line;

the master device and the slave device switching between data from shift register and acknowledgement from a slave controller or a master controller via multiplexers, and the presence and absence of the master device or the slave device being detected through internal pull ups when transaction not being in progress.

An embodiment of the present disclosure provides loopback mechanism on the MISO and MOSI lines determines presence or absence of the master device and slave device in absence of a slave select signal.

An embodiment of the present disclosure provides the method steps for checking the data sanity comprise:

looping back the content of source data line onto destination data line; and comparing the content at every clock edge by a source device controller.

Another embodiment of the present disclosure provides that either of the master device or the slave device is a source depending on whether it is a read or a write transaction.

Another embodiment of the present disclosure provides that the source device sends a flag to destination after transferring every burst of data bits indicating data sanity for each transfer.

Still another embodiment of the present disclosure provides transfer of a burst of data bits includes an address transfer phase and a data transfer phase.

Still another embodiment of the present disclosure provides the address bits flow from master device to slave device and data bits flow in either direction.

Another embodiment of the present disclosure provides the slave device generates an acknowledgement signal to indicate its readiness for the next cycle.

Another embodiment of the present disclosure provides that flag and acknowledgement is a single bit in band signals asserted on the MOSI and MISO lines and is either high or low.

Still another embodiment of the present disclosure provides that the method is implemented by using four signal lines including MOSI, MISO, SCLK, SS for data and control.

Another embodiment of the present disclosure provides that in absence of slave select signal a) the master drives logic 0 on MOSI line, b) the slave, in loopback mode, loops back the contents of MOSI line to MISO line at every clock edge; and c) controller of master samples the contents of MISO at every clock edge, if the master senses logic 1 on its MISO line input, it indicates absence of slave device.

Another embodiment of the present disclosure provides that slave drives logic 0 on the MOSI line indicating valid data transfer and logic 1 for one clock indicating invalid data transfer.

Another aspect of the present disclosure provides a mirrored Serial interface comprising a master device and at least one slave device;

the master device and each of the at least one slave device connected to one another with four signal lines, a serial clock line (SCLK), a master-in-slave-out (MISO) line and a master-out-slave-in (MOSI) line, and a slave select (SS) line for selecting a slave device in a multi-slave configuration;

the master device configured for transmitting data to and receiving data from at least on slave peripheral device, said master peripheral interface device comprising a serial clock generator to generate clock for synchronizing data movement in and out of the device through MOSI and MISO lines, a shift register comprising a group of flip-flops for shifting data into internal storage elements and shifting data out at the serial-out, a memory element and a controller for controlling function of the master device; and the at least one slave device comprising a shift register comprising a group of flip-flops for shifting data into internal storage elements and shifting data out at the serial-out, a memory element, and a controller for controlling function of the slave device, Characterized in that the master device and the at least one slave device have multiplexers to switch between data from shift register and acknowledgement from any of the controller, the master device has an internal pull up at the MISO line and each of the at least one slave device has an internal pull up at the MOSI line to detect presence and absence of master device or slave device when transaction is not in progress, and the data latched by the slave flip-flop at the MISO line is configured to be looped back to the master at every clock edge for reporting communication errors.

These and other features, aspects and advantages of the present subject matter will become better understood with reference to the following description and appended claims. This summary is provided to introduce a selection of concepts in a simplified form. This summary is not intended to be used to limit the scope of the claimed subject matter.

DETAILED DESCRIPTION OF THE INVENTION

Figure 1:
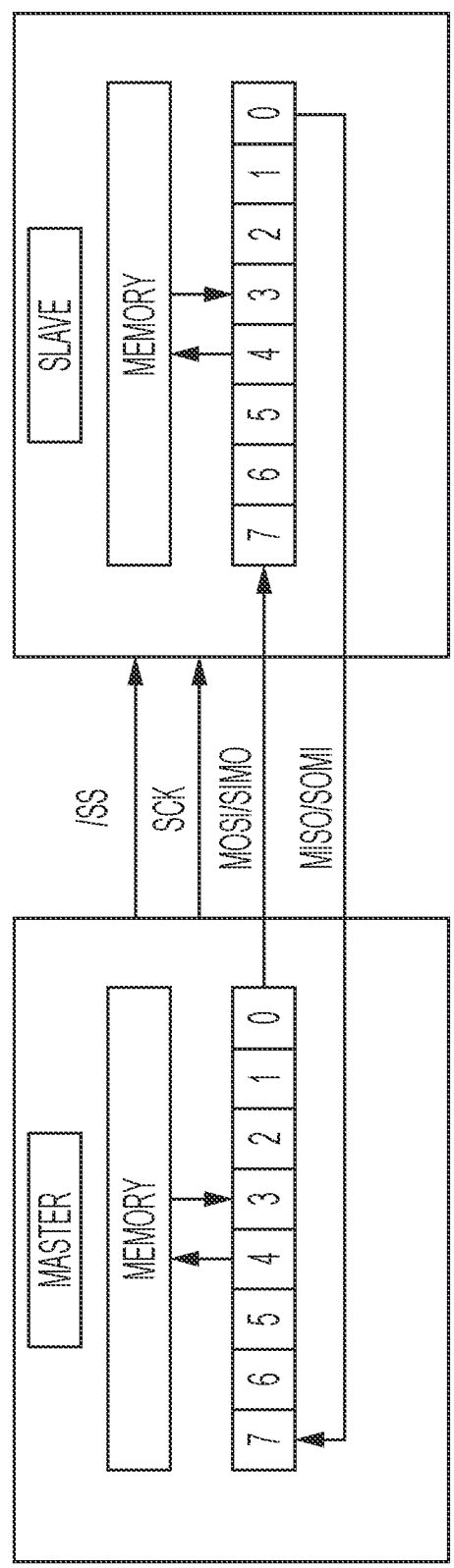
FIG. 1 illustrates the structure of conventional SPI protocol.

The present disclosure relates to a method and a mirrored serial interface (MSI) for transferring data with loopback mechanism through four wire serial interface namely SCLK, SS, MOSI and MISO wherein four wire interface is improved to introduce mechanisms like flow control, acknowledgement, data sanity checks and latency of device served by slave. The present disclosure provides flexible serial protocol with fault resilience as main feature desirable for accessing peripherals with mission critical importance. The protocol is defined for a single/multiple slave devices.

In the present disclosure contents of source data line is looped back onto the destination line and compared at every clock edge to ensure data sanity and assert presence of slave and master device during and between cycles. Herein source refers to the controller which is sending the data and can be either master or slave based on whether it is a read or a write transaction. The signals used in the Mirrored serial interface (MSI) protocol are same as conventional SPI. As mentioned above, in the protocol of present invention, data sanity is checked at every clock edge using loopback mechanism i.e. data latched by the destination flip flop at the MOSI/MISO line is loop backed to the source at every clock edge to check for any communication errors.

After every burst of information (address/data) transfer, the source sends an acknowledgement to destination indicating data sanity for that particular transfer. In case, there is a violation both the master and slave controllers are in sync, and can take appropriate action. Burst of information transfer is an address phase or data phase. Address always flows from master to slave. Data flows in either direction based on whether it is a read or a write transaction. Acknowledgement signal generated by a slave is to indicate its readiness for the next cycle. This mechanism caters to any latency on the part of slow peripherals being served by the slave. The presence/absence of slave and master is ascertained by a loopback mechanism on the MISO and MOSI lines in the absence of any cycle, i.e. in the absence of slave select. Cycle termination or presence of data in case of read cycle is initiated by the slave to cater for any latency on the part of slow peripherals being served by the slave.

Both flag and acknowledgment is single bit in band signals asserted on the MISO or MOSI and can be high or low.

The present disclosure has the following advanced features in comparison to conventional SPI:

Data sanity is checked at every clock edge implementing minoring at the terminating end i.e. data latched by the slave flip flop at the MISO line is looped backed to the master at every clock edge for detecting instantaneous communication errors. The controllers have info about data sanity at every clock edge. Therefore, no need for any error calculation check such as CRC.

After every burst of information (address/data) transfer, the source or destination sends an acknowledgement to destination indicating data sanity for that particular transfer. In case, there is a violation, both the master and slave controllers are in sync, and can take appropriate action.

The presence/absence of slave and master can be ascertained by a looped back mechanism on the MISO and MOSI lines even in the absence of any accessing cycles.

Data transmission can be done at both edges for enhance data rate.

Cycle termination for host processor is automatically initiated by the master to cater slaves of different latencies.

Referring to FIG. 1, which shows a conventional serial peripheral interface protocol. Its implementation uses four signal lines for data and control i.e. SCLK, MOSI, MISO and SS. The shift register of master and slave are connected in a ring formation. In conventional SPI, the master sends a query to slave through MOSI. Simultaneously, slave responds to the previous query on the MISO line because of the ring formation mentioned above. Essentially, because of ring formation there is bidirectional flow of data but without any error checking. Master and slave controller in SPI do not sense the data lines. They only load and unload data from shift registers, align clock polarity, phases, configure clock frequency and present it for further processing.

Figure 2:
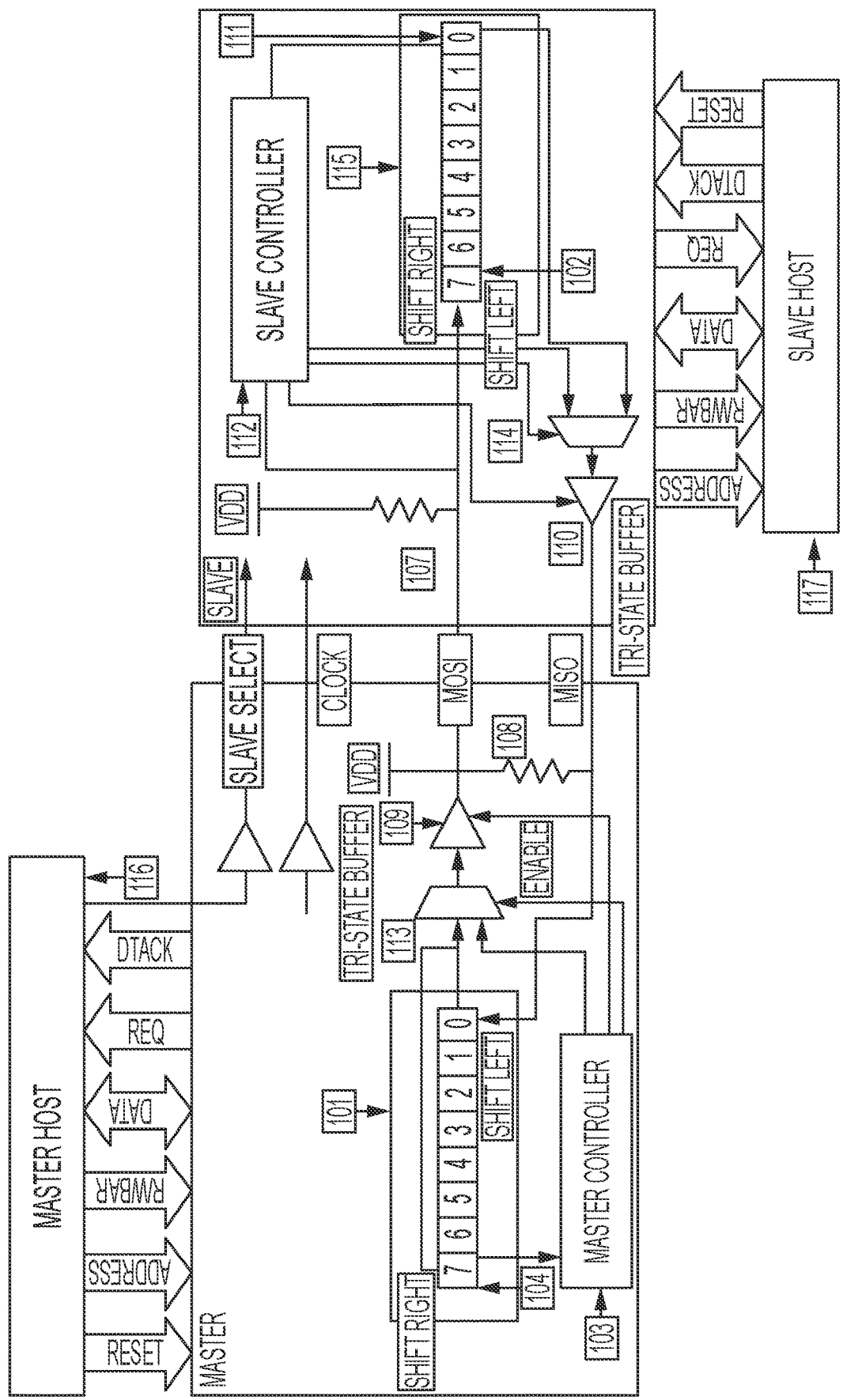
FIG. 2 shows the fundamental building blocks of Mirrored Serial Interface (MSI)

Referring to FIG. 2, which shows the implementation of mirrored serial interface (MSI) according to embodiment of the present disclosure. The mirrored serial interface (MSI) have the presence of physical layer mirroring where data is sent back after the first bit is latched by the slave shift register. As per present disclosure, there is a master device and a number of slave devices, however in FIG. 2, one master device and one slave device have been shown.

To achieve the mirroring i.e. to implement the loopback mechanism the following hardware building blocks and interconnects are used in the mirrored serial interface (MSI) protocol:

1) Presence of mux [113] and [114] to switch between data from shift registers and acknowledgment from master/slave controller.

2) Internal pull ups [107] and [108] on MOSI line in slave and MISO line in master respectively to detect presence and absence of slave when transaction is not in progress.

3) Data from Slave MSB and master MSB is sent to master controller. Similarly, data from slave LSB and master LSB is sent to slave controller.

4) Master and slave controller in mirrored serial interface (MSI) senses the data lines at every clock edge to compare the contents.

FIG. 2 shows the fundamental building blocks of Mirrored Serial Interface (MSI).

1) MASTER AND SLAVE SHIFT REGISTER [101] and [115]: These register shift data between master and slave modules under the control of their respective controllers. They are connected to respective MUX ([113] and [114]) send data to the destination end. Also, they are connected to respective controllers to enable comparison of looped back data at every clock edge.

2) MASTER CONTEOLLER [103]: Master controller manages data transfer flow between master and slave. It is responsible for loading and unloading of contents to and from shift register. It also compares the transmitted and looped back data at every clock edge on the MOSI line. It generates acknowledgment signal based after processing the information burst and steers the control of MUX [113]. Master controller also receives the in-band acknowledgment from the slave indicating successful previous information burst. It receives address, data, read/write command indication from MASTER HOST [116] and communicates if the cycle was successful or unsuccessful back to the HOST.

3) SLAVE CONTROLLER [112]: Slave controller manages data flow between master and slave. It loads and unloads contents to and from shift register. It also compares the transmitted and looped back data at every clock edge on the MISO line. It generates acknowledgment signal. It generates acknowledgment signal based after processing the information burst and steers the control of MUX [114]. Slave controller also receives the in-band acknowledgment from the master indicating successful previous information burst. It sends address, data, read/write command indication from SLAVE HOST [117] for further processing.

The protocol between master and slave based on the algorithm running in their respective controllers as mentioned in FIGS. 3-8 is as follows:

In the absence of any slave select signal master drives logic 0 on the MOSI line. Slave on the contrary is in loopback mode, i.e. it loops the contents MOSI line back to the MISO line at every clock edge. Controller of master samples the contents of MISO at every clock edge. In the absence of slave device, i.e. its power failure or reset condition, MISO line is in tri state. As a result, master sense logic 1 on its MISO input because of its internal pull up indicating the absence of slave device. Similarly in the absence of master device, i.e. its power failure of reset condition, MOSI line is in tri state. Hence, the slave senses logic 1 on its MOSI input because of internal pull up indicating absence of master device.

Figure 3:
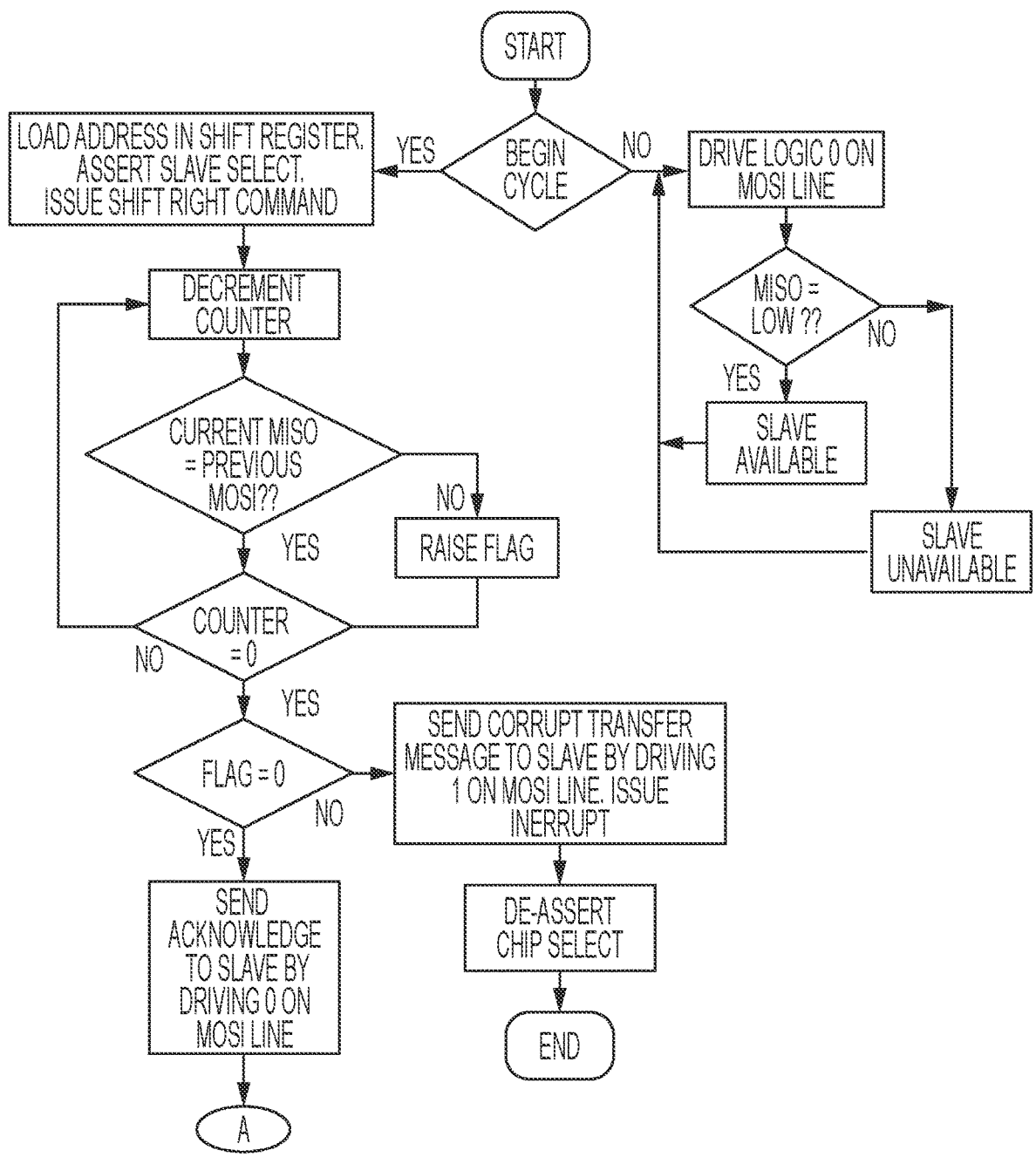
FIGS. 3, 4 & 5 are flowcharts of the control mechanism of Master Controller.
Figure 4:
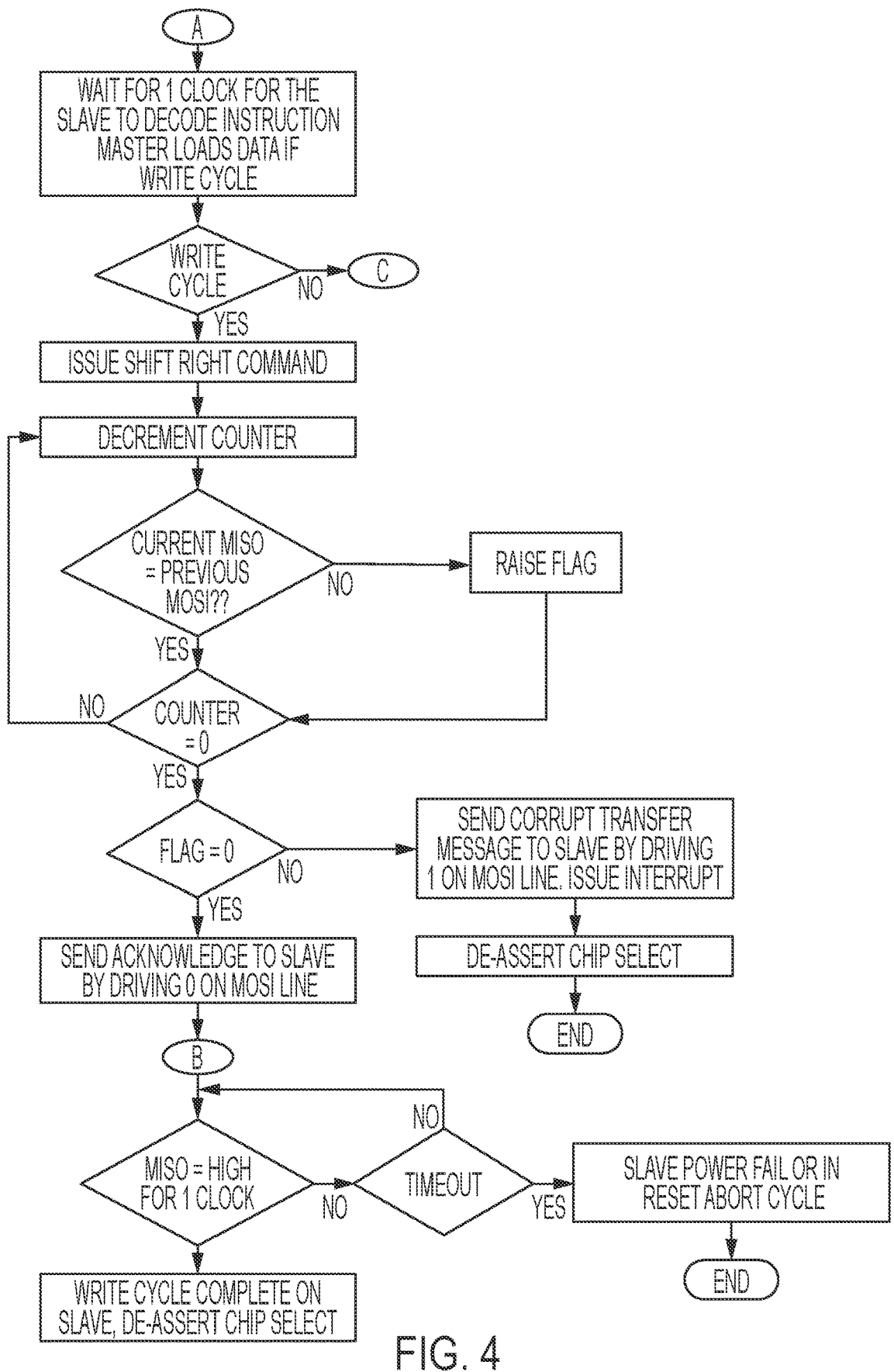
Figure 5:
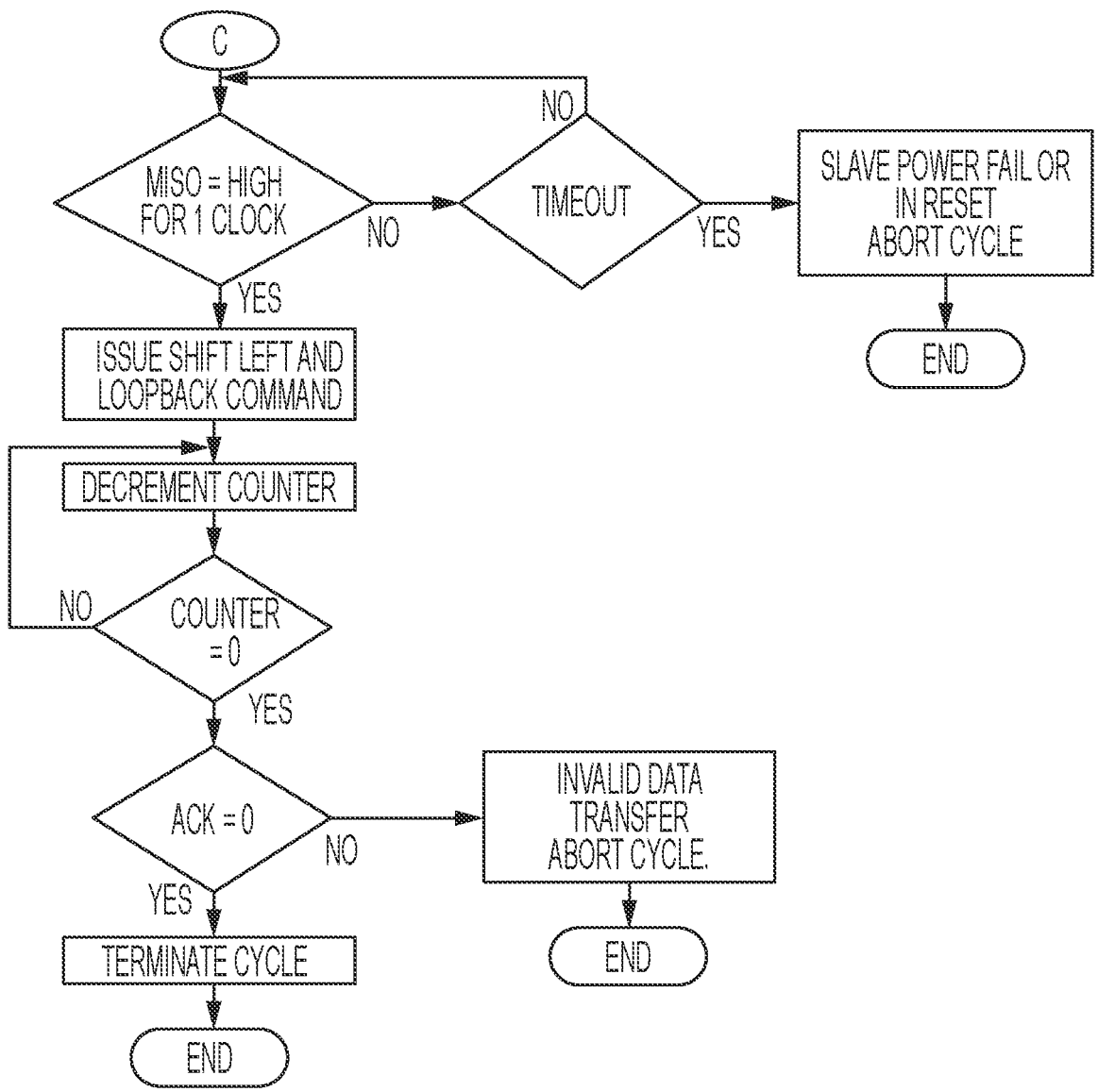

Referring to FIGS. 3, 4 and 5, showing flowcharts of control mechanism of Master Controller [103].

First burst of information transfer is the address phase. Host for master loads address along with read/write bit in the universal shift register [101]. Address length is 8 bits and 1 bit for read/write making a total of 9 bits. R/W⁻(Read/Write bar) shall be logic '1' for read transaction and logic '0' for write transaction. The transaction between master and slave shall begin with assertion of slave select as in the case of SPI. All this information is transmitted on the MOSI line. Also, it sends back on the MISO line as the output of flip-flop [102] receiving the first bit on MOSI line. This is done to verify address sanity by the master. Comparison logic in the master controller [103] asserts the validity by comparing the data looped back from the slave [102] with the data looped back internally [104] on a particular clock edge.

Master keeps the clock enabled after first burst of address transfer. There is a wait state equivalent to 1 clock cycle during which master checks the sanity of the address transfer. Correspondingly, slave extract address along with the R/W⁻bit. On the next clock, master send an acknowledgement on MOSI line by driving logic 0 for 1 clock cycle indicating successful address transfer. In case the transfer was corrupt, logic 1 shall be sent for 1 clock cycle. Controller FSM's of both master and slave aborts the cycle in this case. Address and R/W⁻ bit from slave universal shift register are unloaded by the slave controller into the host.

If it is a write cycle, Master sends data on the MOSI line which is looped back on the MISO line by the slave as in the case of address transfer to ensure data sanity during the transfer. There is again a wait state of one clock during which master checks sanity of data transfer. An acknowledgement signal in the form of logic 0 is sent by the master to the slave to indicate valid transfer and logic 1 for one clock otherwise on the next clock. Cycle is aborted by both master and slave in case data transfer was corrupt. In case of valid data transfer, controller unloads the data from the universal shift register into the host. Since the address and data are now available to the host for processing, controller interrupts the host to retrieve the contents from register for further processing.

This is a wait phase for the master while the slave is busy processing the instruction. During this phase, Master continues to drive logic 0 on the MOSI line. Slave continues to loopback the contents MOSI line on the MISO line till it has not finished its transaction with the peripheral. In case, slave undergoes reset/power failure during this phase, loopback mechanism breaks because there is logic '1' on the master because of internal pull up and master can abort the cycle by de-asserting slave select. There shall also be a pre-configured timeout counter in the master controller to ensure the wait phase does not extend beyond a particular delay in case the host is in hung state. After the slave host finishes the processing it sends an ACK to slave controller. Slave shall then generate a pulse equal to one clock width on MISO line to indicate completion of transaction. Master waits for one more clock after receiving ACK to ensure it MISO goes low indicating a successful acknowledgment. Master then asserts DTACK (Data acknowledgement) to the Master Host indicating successful cycle. Master Host then de-asserts Slave select and terminates the cycle. In case, it is a read cycle, Slave controller shall interrupt the host to unload the address from universal shift register. Host then begins its independent read cycle on another register/peripheral device.

Figure 6A:
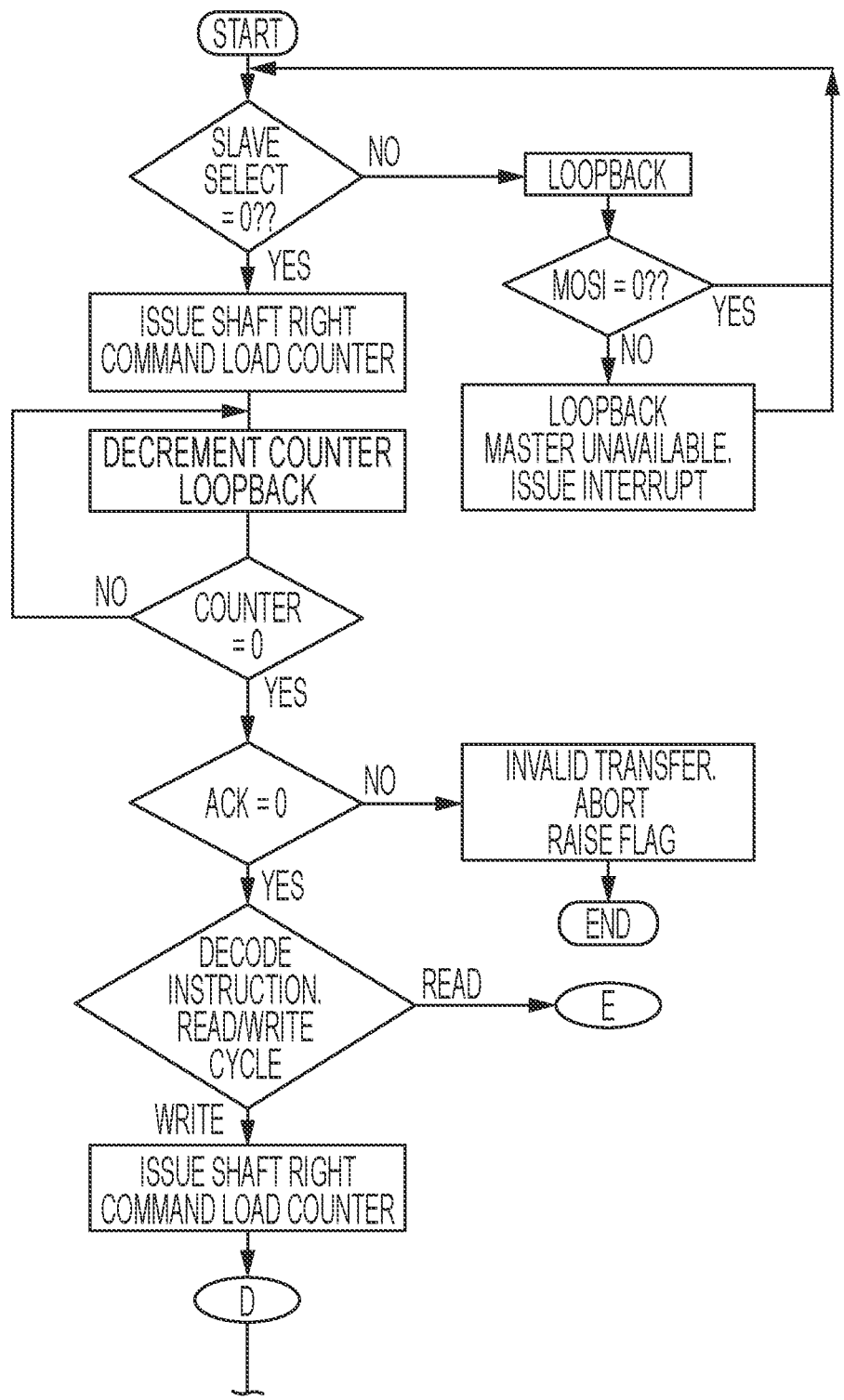
FIGS. 6A, 6B & 7 are flowcharts of the control mechanism of Slave Controller.
Figure 6B:
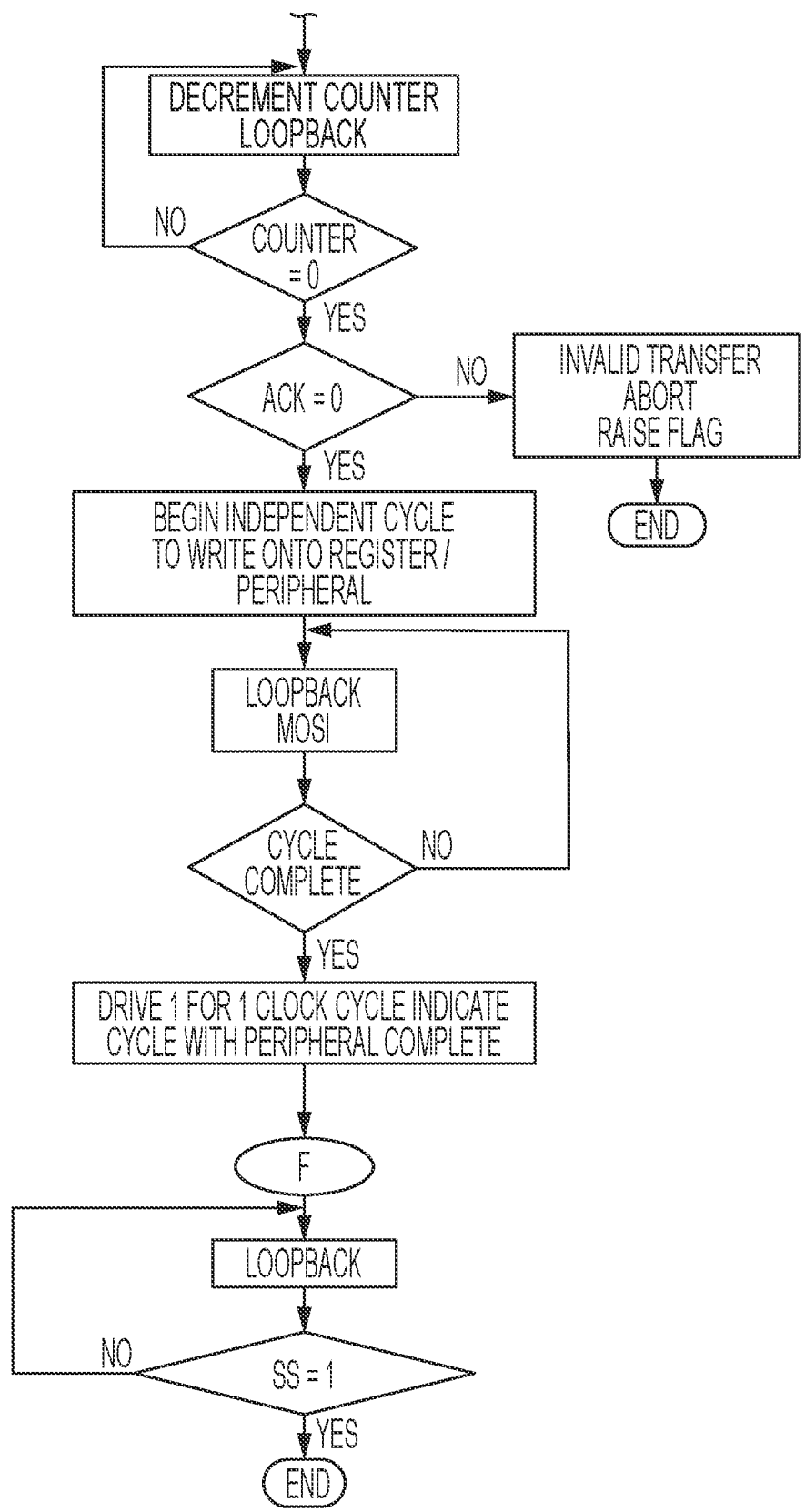
Figure 7:
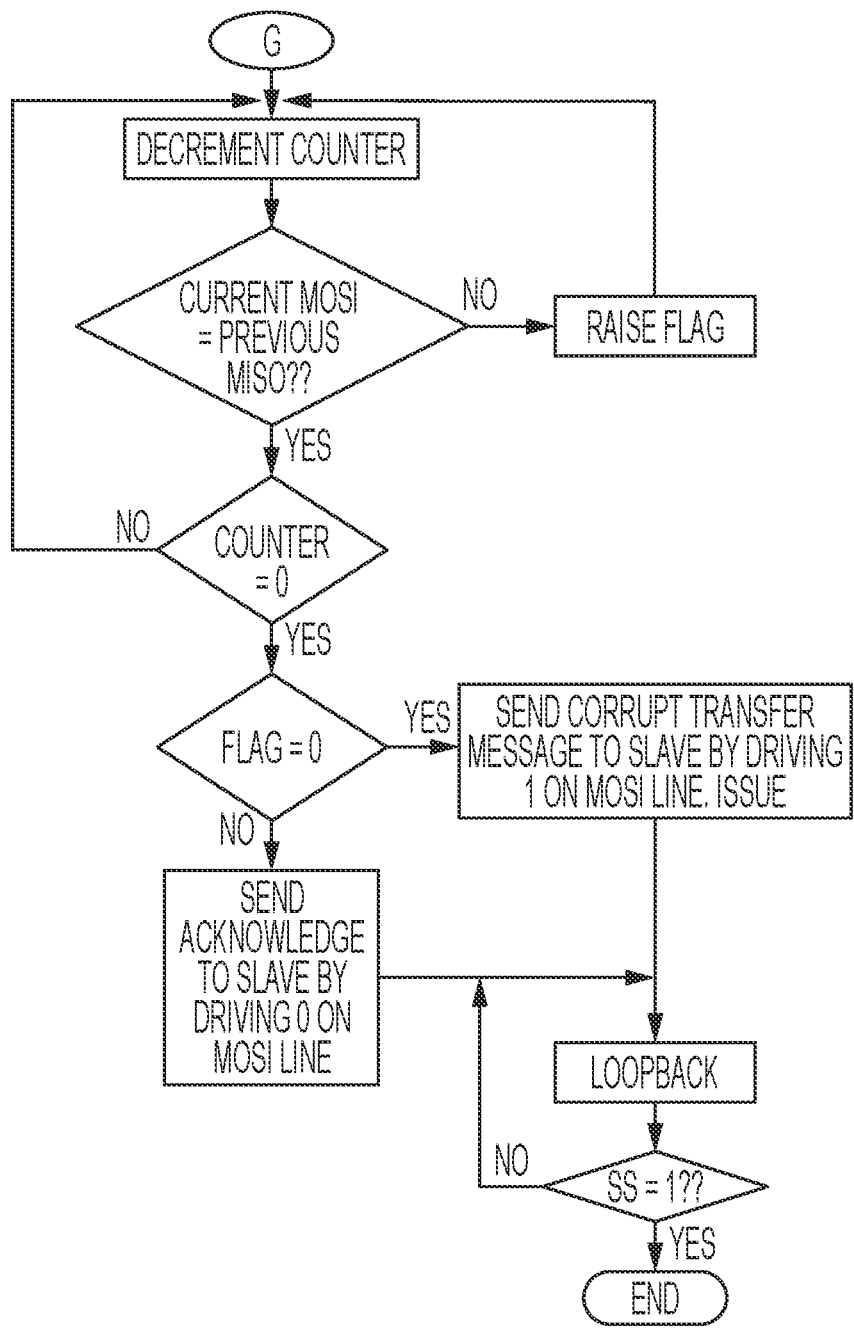

Referring to FIGS. 6A, 6B & 7, showing flowcharts of the control mechanism of Slave Controller. Master continues to drive logic 0 on the MOSI line. Slave continues to loopback the contents of MOSI line on the MISO line till it has not finished its transaction with the peripheral. In case, slave undergoes reset/power failure during this phase, loopback mechanism breaks because there will be logic '1' on the master because of internal pull up and master can abort the cycle. There is also a pre-configured timeout counter in the master controller to ensure the wait phase does not extend beyond a particular delay in case the host is in hung state. After the slave host finishes the processing it sends an ACK to slave controller.

Slave then generate a pulse equal to one clock width on MISO line to indicate availability of data in its shift register. Master waits for one more clock after receiving ACK to ensure it MISO goes low indicating a successful acknowledgment. Master then reads the data from the slave which is looped back on the MOSI line [109]. Comparison logic in the slave controller [112] shall assert the validity by comparing the data looped back from the master [101] with the data looped back internally [111] on a particular clock edge.

Slave drives logic 0 on the MISO line indicating valid data transfer and logic 1 for one clock indicating invalid/corrupt data transfer. Master de-asserts slave select to terminate cycle if data transfer was valid. In case of invalid data transfer, cycle is terminated.

Advantages of the Invention

Ensure data sanity;
Ensure presence/absence of master and slave;
Provide flow control to cater slow peripheral devices;
Provide acknowledgement on receipt of data;

We claim:

1. A method of transmitting data via a mirrored serial interface, the method comprising:
   a master device receiving an address, data and a read/write command from a master host, loading the address and read/write command first in a master shift register, shifting the address and the read/write command to a slave device via a master-out slave-in (MOSI) line, simultaneously receiving mirrored address and read/write bits via a master-in slave-out (MISO) line to check for data sanity using the most significant bit looped back at every clock edge by a destination slave;
   the slave device after successful transmission of address information fetching data from a slave host;

upon receiving the read instruction, the slave device sending data to the master device via the MISO line, simultaneously receiving mirrored data bits via the MOSI line to check for data sanity using the most significant bit looped back at every clock edge by a destination master;

upon receiving the write instruction, the slave receiving the data from the master device and sharing it with the slave host for further processing, the master device again checking the mirrored data bits via the MISO line using the most significant bit looped back at every clock edge by the destination slave; and the master device and the slave device switching between data from the shift register and acknowledgement from a slave controller or a master controller via multiplexers, the presence and absence of the master device or the slave device being detected through internal pull ups when a transaction is not in progress, and the internal pull ups detect the presence and absence of the master device or slave device only when an address, read/write transaction is not in progress.

2. The method as claimed in claim 1, wherein a loopback mechanism on the MISO and MOSI lines determines presence or absence of the master device and slave device in absence of a slave select signal.

3. The method as claimed in claim 1, wherein method steps for checking the data sanity comprise: —looping back the content of a source data line onto a destination data line; and comparing the content at every clock edge by a source device controller.

4. The method according to claim 3, wherein either one of the master device or the slave device is a source depending on whether the transaction is a read or a write transaction.

5. The method according to claim 3, wherein the source device sends a flag to the destination after transferring every burst of data bits indicating data sanity for each transfer.

6. The method according to claim 5, wherein a transfer of a burst of data bits includes an address transfer phase and a data transfer phase.

7. The method according to claim 6, wherein the address bits flow from the master device to the slave device and data bits flow in either direction.

8. The method according to claim 7, wherein the slave device generates an acknowledgement signal to indicate its readiness for the next cycle.

9. The method according to claim 8, wherein the flag and the acknowledgement are a single bit in band signals asserted on the MOSI and MISO lines and are either high or low.

10. The method according to claim 5, wherein the flag and the acknowledgement are a single bit in band signals asserted on the MOSI and MISO lines and are either high or low.

11. The method as claimed in claim 1, wherein either the master device or the slave device is a source depending on whether the transaction is a read or a write transaction.

12. The method as claimed in claim 1, wherein a source device sends a flag to the destination after transferring every burst of data bits indicating data sanity for each transfer.

13. The method according to claim 12, wherein a transfer of a burst of data bits includes an address transfer phase and a data transfer phase.

14. The method according to claim 13, wherein the address bits flow from the master device to the slave device and data bits flow in either direction.

15. The method according to claim 14, wherein the slave device generates an acknowledgement signal to indicate its readiness for the next cycle.

16. The method according to claim 12, wherein the flag and the acknowledgement are a single bit in band signals asserted on the MOSI and MISO lines and are either high or low.

17. The method according to claim 1, wherein the method is implemented by using four signal lines including MOSI, MISO, serial clock (SCLK), and slave select (SS) for data and control.

18. The method according to claim 1, wherein in absence of the slave select signal a) the master drives logic 0 on the MOSI line, b) the slave, in loopback mode, loops back the contents of the MOSI line to the MISO line at every clock edge; and c) a controller of the master samples the contents of the MISO at every clock edge, if the master senses logic 1 on its MISO line input, it indicates the absence of a slave device.

19. The method according to claim 1, wherein slave drives logic 0 on the MOSI line indicating valid data transfer and logic 1 for one clock indicating invalid data transfer.

20. A mirrored Serial interface comprising:

a master device and at least one slave device;

the master device and each of the at least one slave device connected to one another with four signal lines, a serial clock line (SCLK), a master-in-slave-out (MISO) line and a master-out-slave-in (MOSI) line, and a slave select (SS) line for selecting a slave device in a multi-slave configuration;

the master device configured for transmitting data to and receiving data from at least one slave peripheral device, said master peripheral interface device comprising a serial clock generator to generate a clock for synchronizing data movement in and out of the device through MOSI and MISO lines, a shift register comprising a group of flip-flops for shifting data into internal storage elements and shifting data out at a serial-out, a memory element and a controller for controlling function of the master device; and the at least one slave device comprising a shift register comprising a group of flip-flops for shifting data into internal storage elements and shifting data out at the serial-out, a memory element, and a controller for controlling functions of the slave device, wherein the master device and the slave device have multiplexers to switch between data from a shift register and acknowledgement from any of the controllers, the master device has an internal pull up at the MISO line and each of the at least one slave device has an internal pull up at the MOSI line to detect presence and absence of the master device or the slave device only when a transaction is not in progress, and the data latched by the slave most significant bit flip-flop at the MOSI line is configured to be looped back to the master on the MISO line at every clock edge for reporting communication errors in the case of an address and write transaction, and the data latched by the master most significant bit flip-flop at the MISO line is configured to be looped back to the slave on the MOSI line at every clock edge for reporting communication errors in the case of a read transaction.

* * * * *